US007995678B2

(12) United States Patent
Norris et al.

(10) Patent No.: US 7,995,678 B2
(45) Date of Patent: Aug. 9, 2011

(54) SYSTEM AND METHOD FOR COMMUNICATING DATA USING WEIGHTED BIT SOFT DECISIONS FOR DIFFERENTIALLY ENCODED PHASE SHIFT KEYING

(75) Inventors: James A. Norris, Fairport, NY (US); John W. Nieto, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 861 days.

(21) Appl. No.: 11/946,137

(22) Filed: Nov. 28, 2007

(65) Prior Publication Data

US 2009/0135957 A1 May 28, 2009

(51) Int. Cl.
*H04L 27/22* (2006.01)
(52) U.S. Cl. ........ 375/330; 375/279; 375/280; 375/281; 375/282; 375/283; 375/316; 375/329; 375/331; 375/332
(58) Field of Classification Search .......... 375/279–283, 375/316, 329–332
See application file for complete search history.

(56) References Cited

U.S. PATENT DOCUMENTS

| | | | | |
|---|---|---|---|---|
| 4,742,533 A * | 5/1988 | Weidner et al. | ................ | 375/331 |
| 5,517,530 A * | 5/1996 | Gardner | ................ | 375/325 |
| 5,546,428 A | 8/1996 | Nam et al. | ................ | 375/308 |
| 5,553,098 A * | 9/1996 | Cochran et al. | ................ | 375/324 |
| 5,754,600 A | 5/1998 | Rahnema | ................ | 375/341 |
| 5,892,803 A | 4/1999 | Saunders et al. | ................ | 375/355 |
| 6,084,926 A * | 7/2000 | Zak et al. | ................ | 375/341 |
| 6,487,255 B1 * | 11/2002 | Arslan et al. | ................ | 375/262 |
| 6,654,432 B1 * | 11/2003 | O'Shea et al. | ................ | 375/354 |
| 7,315,578 B2 * | 1/2008 | Cheng | ................ | 375/261 |
| 7,398,454 B2 * | 7/2008 | Cai et al. | ................ | 714/780 |
| 7,428,273 B2 * | 9/2008 | Foster | ................ | 375/329 |
| 2006/0136797 A1 | 6/2006 | Cai et al. | ................ | 714/752 |

OTHER PUBLICATIONS

Divsalar et al., "Multiple-Symbol Differential Detection of MPSK," IEEE Transactions on Communications, vol. 38, No. 3, Mar. 1990, pp. 300-308.

* cited by examiner

*Primary Examiner* — Chieh M Fan
*Assistant Examiner* — Sophia Vlahos
(74) *Attorney, Agent, or Firm* — Allen, Dyer, Doppelt, Milbrath & Gilchrist, P.A.

(57) ABSTRACT

A receiver includes a signal input for receiving a differentially-encoded quadrature phase-shift keyed (DEQPSK) communication signal. A demodulator performs bit decisions on a received coherent symbol and bit decisions on a received differential symbol. A processor is operative with the demodulator and scales a soft decision by a factor from 0 to 1 when the results of the bit decisions on the received coherent branch and differential branch are different.

25 Claims, 7 Drawing Sheets

SYSTEM AND METHOD FOR COMMUNICATING DATA USING WEIGHTED BIT SOFT DECISIONS FOR DIFFERENTIALLY ENCODED PHASE SHIFT KEYING

FIELD OF THE INVENTION

The present invention relates to communications systems and, more particularly, the present invention relates to communications systems that use differentially encoded phase shift keying modulation combined with forward error correction techniques.

BACKGROUND OF THE INVENTION

Some multi-band or other tactical radios operate in the high frequency (HF), very high frequency (VHF), and ultra high frequency (UHF) bands. The frequency range of these multi-band tactical radios is from about 2 MHz to about 512 MHz. Next generation radios will probably cover about 2.0 to about 2,000 MHz (or higher) to accommodate wider bandwidths, higher data rates and less crowded frequency bands. Several standards have been developed for the different frequency bands. For HF, US-MIL-STD-188-110B and US-MIL-STD-188-141B specify waveforms and minimum performance requirements of waveforms and radio equipment, the disclosures which are incorporated by reference in their entirety.

UHF standards, on the other hand, provide different challenges over the 225 to about 512 MHz frequency range, including short-haul line-of-sight (LOS) communication and satellite communications (SATCOM) and cable. UHF waveforms operate through different weather conditions, foliage and other obstacles making UHF SATCOM an indispensable communications medium for many agencies. Different directional antennas can be used to improve antenna gain and improve data rates on the transmit and receive links. This type of communication is typically governed in one example by MIL-STD-188-181B, the disclosure which is incorporated by reference in its entirety. This standard specifies a family of constant and non-constant amplitude waveforms for use over satellite links.

The joint tactical radio system (JTRS) implements some of these standards and has different designs that use oscillators, mixers, switchers, splitters, combiners and power amplifier devices to cover different frequency ranges. The modulation schemes used for these types of systems can occupy a fixed bandwidth channel at a fixed carrier frequency or can be frequency-hopped. These systems usually utilize memoryless modulations, such as M-ary phase shift keying (M-PSK) (where M-ary is the number of choices available, for example, to send 2 bits one would use $2^2$-ary), M-ary amplitude shift keying (M-ASK), M-ary frequency shift keying (M-FSK), M-ary quadrature amplitude modulation (M-QAM), or modulations with memory such as continuous phase modulation (CPM) and combine them with a convolutional or other type of forward error correction code. To ensure interoperability, standardized waveforms are often used.

In addition to specifying the modulations used for interoperability in military standards, minimum performance requirements are often included. For example, existing MIL-STD-188-183 and 183A terminals require acquisition and demodulation of differential quadrature phase shift keyed (DEQPSK) waveforms at bit error rate (BER) specification points very close to 1 decibel (dB) from the theoretical limit, allowing very small modem implementation losses and very stringent testing requirements. To cope with these tight BER performance requirements, improvements to the DEQPSK bit soft decisions (used in the decoding of the rate 1/2, K=7 convolutional forward error correction code) would be advantageous.

A quick review of QPSK and DEQPSK will now be presented. QPSK modulation can be expressed as $$s_m(t) = \sqrt{E_s} \cos\left[2\pi f_c t + \frac{2\pi}{4}(m-1)\right], \ 1 \le m \le 4, \ 0 \le t \le T \quad (1)$$

where t is time, $\sqrt{E_s}$ is the carrier amplitude, $f_c$ is the carrier frequency and T is the QPSK symbol time. As can be observed from equation (1), every symbol time T the phase of the carrier $f_c$ will change by one of 4 possible values. The equivalent baseband representation of QPSK would eliminate the carrier and what is observed is that for every 2 bits input to a QPSK modulator, one of the 4 possible phases $$\left(0, \frac{\pi}{2}, \pi, \frac{3\pi}{2}\right)$$

would be output (note that other possible phases can be used as long as they are equally spaced around a circle). For example, assuming that data bits "01" are sent as the $$\frac{\pi}{2}$$

phase, to send the data pattern "01,01,01,01", phases $$\left(\frac{\pi}{2}, \frac{\pi}{2}, \frac{\pi}{2}, \frac{\pi}{2}\right)$$

would be output by QPSK modulator. At the receiver, assuming no frequency or phase errors, the demodulator would simply find the closest one of the 4 possible phases $$\left(0, \frac{\pi}{2}, \pi, \frac{3\pi}{2}\right)$$

to the received symbol and output the two bits associated with that phase. Although QPSK is a very simple modulation, the demodulation process can become somewhat complicated if a phase and/or frequency error exists between the transmitter (TX) and the receiver (RX) since a phase/frequency tracker would be required for proper operation.

A modulation which eliminates the need for phase/frequency tracking is DEQPSK. Instead of transmitting data implicitly in the phase of the carrier (i.e. QPSK), DEQPSK sends the data as a change in phase between the last transmitted phase (or symbol) and the current phase (or symbol). For example, assuming a starting phase of 0 and assuming data bits "01" are sent as a $$\frac{\pi}{2}$$

change in phase, to send the data pattern "01,01,01,01", phases $$\left(0, \frac{\pi}{2}, \pi, \frac{3\pi}{2}, 0\right)$$

would be output by DEQPSK modulator (where 0 is starting "reference" phase). At the receiver, the demodulation process would simply multiply the current received symbol by the conjugate of the last received symbol (if symbols are complex numbers) or just compute the actual phase difference (if receive symbols are phase values) and find the closest one of the 4 possible delta phases. Although this simplifies the receiver significantly, a 2.3 dB degradation in performance results since the last received symbol used to determine the delta phase (i.e. data) contains noise.

Possible improvements in performance are possible by modifying the demodulation process to be closer to coherent. If a phase/frequency tracker were used, it is possible to reduce the noise of the "last received symbol" by demodulating as if the waveform were QPSK (instead of DEQPSK) and then re-mapping the QPSK bits back to DEQPSK bits (i.e. please note the huge difference in transmitted phases, for the same input data, between QPSK and DEQPSK in examples provided earlier).

SUMMARY OF THE INVENTION

A receiver includes a signal input for receiving a differentially-encoded quadrature phase-shift keyed (DEQPSK) communication signal. A demodulator performs bit decisions on a received non-differential phase (i.e. coherent) and bit decisions on a received differential phase. A processor is operative with the demodulator and scales the bit soft decisions by a factor from 0 to 1 (or higher) when the results of the bit decisions made on the coherent branch and differential branch are different.

The processor is also operative for obtaining a last received symbol, conjugating the symbol and multiplying it by a current received symbol such that the phase change between the two symbols corresponds to an estimate of the data. A phase tracker is operative with the demodulator for tracking phase and frequency in order to demodulate a coherent estimate of data. This processor is operative with the demodulator for obtaining an estimate of the data using the phase tracker.

In yet another aspect the processor is operative for obtaining a differential phase by correlating previous results from current results to obtain a difference in phase. An absolute phase (i.e. coherent demodulation) can also be obtained via a frequency/phase tracker and this QPSK demodulated data can then be used to determine the DEQPSK data that would have resulted in the current received coherent phase using a look-up table and the previous received QPSK symbol. Note that this conversion is necessary since transmitted data is not the received symbol (as would be the case for QPSK) but the difference in phase between the last symbol and current symbol (because we are trying to demodulate a DEQPSK waveform using a coherent process).

A method is also set forth.

BRIEF DESCRIPTION OF THE DRAWINGS

Other objects, features and advantages of the present invention will become apparent from the detailed description of the invention which follows, when considered in light of the accompanying drawings in which:

FIG. 3A shows the bit error rate (BER) on the vertical axis and the signal-to-noise ratio in decibels Eb/No (dB) on the horizontal axis.

DETAILED DESCRIPTION OF THE PREFERRED EMBODIMENTS

Figure 1:
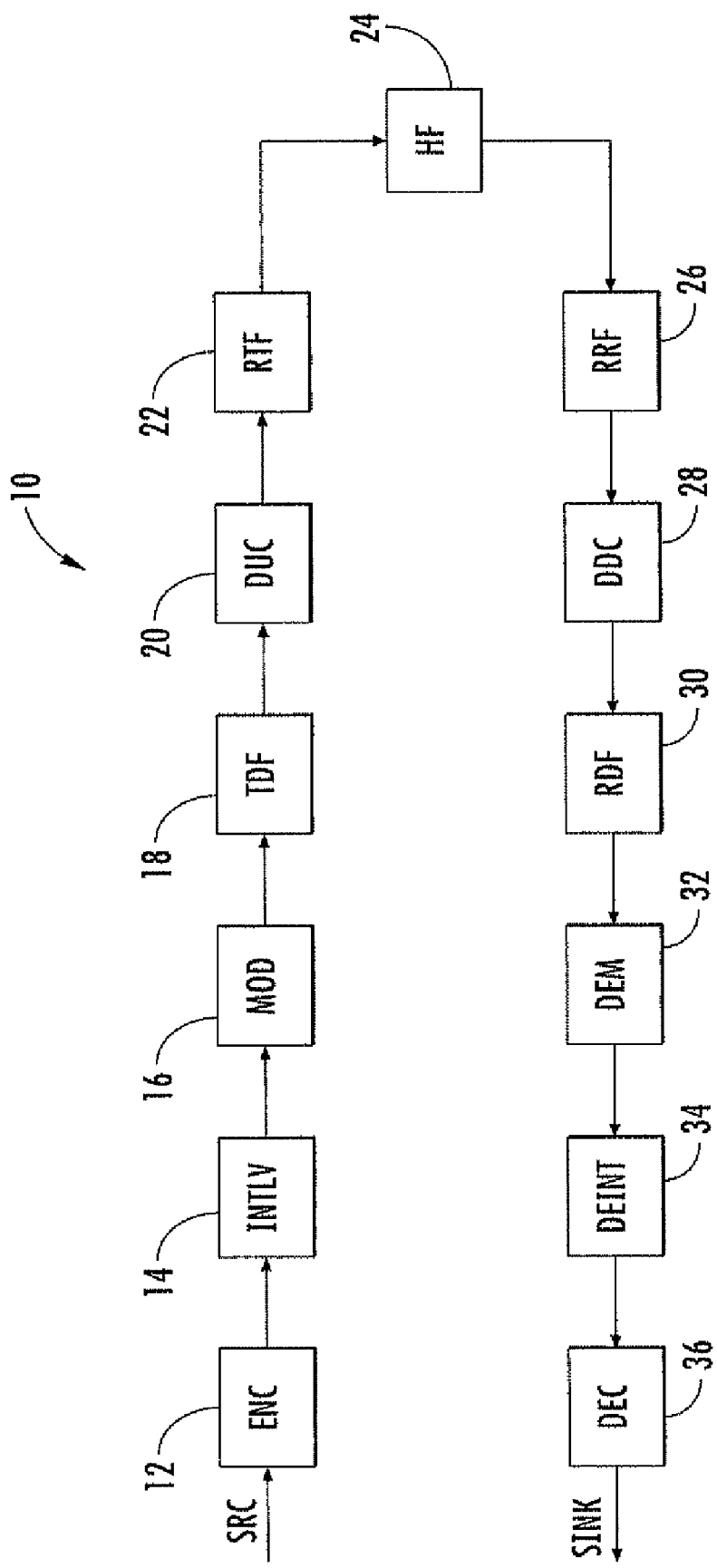
FIG. 1 is a block diagram of an example of a typical prior art high frequency communication system showing different modulators and demodulators, filters, interleavers and deinterleavers, and forward error correction (FEC) encoders and decoders.

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art.

It should be appreciated by one skilled in the art that the approach to be described is not limited for use with any particular communication standard (wireless or otherwise) and can be adapted for use with numerous wireless (or wired) communications standards such as Enhanced Data rates for GSM Evolution (EDGE), General Packet Radio Service (GPRS) or Enhanced GPRS (EGPRS), extended data rate Bluetooth, Wideband Code Division Multiple Access (WCDMA), Wireless LAN (WLAN), Ultra Wideband (UWB), coaxial cable, radar, optical, etc. Further, the invention is not limited for use with a specific PHY or radio type but is applicable to other compatible technologies as well.

Throughout this description, the term communications device is defined as any apparatus or mechanism adapted to transmit, receive or transmit and receive data through a medium. The communications device may be adapted to communicate over any suitable medium such as RF, wireless, infrared, optical, wired, microwave, etc. In the case of wireless communications, the communications device may comprise an RF transmitter, RF receiver, RF transceiver or any combination thereof. Wireless communication involves: radio frequency communication; microwave communication, for example long-range line-of-sight via highly directional antennas, or short-range communication; and/or infrared (IR) short-range communication. Applications may involve point-to-point communication, point-to-multipoint communication, broadcasting, cellular networks and other wireless networks.

As will be appreciated by those skilled in the art, a method, data processing system, or computer program product can embody different examples in accordance with a non-limiting example of the present invention. Accordingly, these portions may take the form of an entirely hardware embodiment, an entirely software embodiment, or an embodiment combining software and hardware aspects. Furthermore, portions may be a computer program product on a computer-usable storage medium having computer readable program code on the medium. Any suitable computer readable medium may be utilized including, but not limited to, static and dynamic storage devices, hard disks, optical storage devices, and magnetic storage devices.

The description as presented below can apply with reference to flowchart illustrations of methods, systems, and computer program products according to an embodiment of the invention. It will be understood that blocks of the illustrations, and combinations of blocks in the illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions specified in the block or blocks.

These computer program instructions may also be stored in a computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

For purposes of description, a typical high frequency communications system used for transmitting and receiving digital data is described with reference to FIG. 1. This system can communicate using different standards and waveforms, including waveforms pertaining to the MIL-STD-188-110B and MIL-STD-188-181C standard for integrated waveforms and MIL-STD-188-183 and 183A terminals. The system and method can employ this technology and adopt it and apply the improved weighting of DEQPSK soft decisions in accordance with a non-limiting example of the present invention.

As shown in FIG. 1 for this typical HF communications system 10 at a transmit section, a data stream (Src) that is to be transmitted is forwarded as 1's and 0's as is typical. The encoder 12 is operative as a Forward Error Correction (FEC) encoder and applies a FEC algorithm to the data, which passes to an interleaver 14, which interleaves the data, which is then modulated by a modulator 16. In some prior art systems having similar functions, differential modulation is applied at this point. The modulated data is passed into a transmit digital low-pass filter 18, and then up-converted by a digital up-conversion circuit 20 from baseband to an 1800 Hz carrier in this one non-limiting example. A radio transmit filter (RTF) 22 limits the bandwidth of the transmit waveform to about 3 KHz. The data is passed to a high frequency, multi-path and fading channel simulator circuit (meant to simulate an HF channel) 24, where multi-path is modeled as a tapped-delay line, and each tap in the tapped-delay line has fading characteristics based on the Watterson model.

At a receiver section, a radio receive filter 26 limits the bandwidth of the data signal to about 3 KHz. The data is digitally down-converted in the converter 28 from 1800 Hz carrier to baseband in this non-limiting example. The data passes into a receive digital low-pass filter 30 that is ideally the same as the transmit digital low-pass filter (TDF) 18. The demodulation occurs followed by deinterleaving within a deinterleaver circuit 34. The forward error correction (FEC) decoder circuit 36 decodes the data and passes it as a received bit stream (Sink).

In accordance with a non-limiting example of the present invention, a DEQPSK receiver modem recovers the phase and frequency of the transmitted signal with coherent demodulation and also differentially demodulates the received samples. It should be understood that differential phase shift keying modulation degrades system performance (when compared to coherent demodulation) but simplifies the receiver complexity by not requiring a frequency and phase tracker. To demodulate a DEPSK waveform one simply compares the last received symbol to the current one. For example, the last received symbol would serve as a reference and a "1" could be denoted by no change in the phase between last symbol and current symbol and a "0" could be denoted by a change of 180 degrees. It should be understood that phase shift keying is a digital modulation scheme that conveys data by changing or modulating the phase of a carrier signal. PSK uses a finite number of phases with each phase assigned a unique pattern of binary bits. At the demodulator, the phase of the received signal is determined and mapped back to the symbol it represents to recover the original data. In a coherent system, the receiver compares the phase of the received signal to a reference signal (not to last symbol received as DEPSK would). This reference signal requires a phase/frequency tracker in order to work correctly. Quadrature phase shift keying (QPSK) uses four points on the constellation diagram, equally spaced around a circle. QPSK encodes two bits per symbol typically. A QPSK system can use a binary bit stream that is serial-to-parallel converted and encoded within two steams using a pair of NRZ encoders where the binary data stream is split into the N-phase and quadrature-phase components and separately modulated onto two orthogonal basis functions using two sinusoids. The two signals are superimposed and the resulting signal is the QPSK. Polar non-return-to-zero encoding is possible.

It is possible with the system in accordance with a non-limiting example of the present invention to demodulate coherently and demodulate non-coherently. For the differential demodulator, it is possible to take the last received phase (or last symbol), conjugate it and multiply it by the current phase (or current symbol). The "delta" or change is the data. For DEQPSK, data is encoded in the phase difference between the last symbol and the current symbol. The last symbol could be rotated by 0, 90, 180 or 270 degrees and transmitted as the next symbol. At the receiver, the last symbol is used as a reference for the next symbol.

Soft decision processes are often used. It should be understood that soft decision decoding typically has a demodulator assign a confidence value to each output bit, in addition to a hard binary "0" or "1" decision. Confidence information can be used to improve the decoding process. Hard decision decoding, on the other hand, receives samples that are compared to the output of a demodulator to an optimal threshold. Hard decisions are taken and fed to a decoder where the errors are corrected. For example, when a bit is "1", the signal level exceeds a predetermined level and when a bit is "0" the signal level falls below a predetermined level.

In soft decision decoding, on the other hand, received samples are typically quantized in a multiple bit word and fed to a decoder. Multiple bits can provide "soft" information representing a confidence level in the received data that can perform more reliable decoding than the case of hard decision decoding.

In accordance with a non-limiting example of the present invention, a coherent phase tracker is incorporated in the receive modem and operative as a phase locked loop to demodulate coherently. The phase tracker can guarantee that a noise-free received phase is one of the four expected values (0, 90, 180 and/or 270) degrees). A look-up table can be used to determine the actual DEQPSK data that was used to obtain the coherent symbol. When the hard decision data obtained from the differential demodulation differs from data obtained using coherent demodulation, the soft decisions (either differential, coherent or a combination of both) can be scaled by a small number to include the loss of confidence is these bits. Thus, the system can weigh soft decisions for bits that are considered unreliable. This weighting (i.e. scaling) can also vary as a function of SNR.

Typically, with a DEQPSK signal, the system does not have to recover the transmitted phase. The current phase can be subtracted from the previous phase and the system differences the received phase from symbol to symbol to determine the data. In QPSK, the transmitted phase is the data. For the 181B standard, the differential performance can be enhanced because the system already is accomplishing coherent processing of a preamble and the phase tracker allows coherent demodulation.

In the system, the DEQPSK receive modem can recover the phase and frequency of a transmitted signal as a coherent demodulation process. In a non-limiting example of the present invention, the soft decisions are calculated as a hybrid of the standard distance equation:

$$\text{distance} \cdot x = \text{sqrt}(((cons[0] \cdot x - rx \cdot x) * ((cons[0] \cdot x - rx \cdot x))) +$$
$$((cons[0] \cdot y - rx \cdot y) * ((cons[0] \cdot y - rx \cdot y))) +$$
$$((cons[2] \cdot x - rx \cdot x) * ((cons[2] \cdot x - rx \cdot x))) +$$
$$((cons[2] \cdot y - rx \cdot y) * ((cons[2] \cdot y - rx \cdot y)))) -$$
$$\text{sqrt}(((cons[1] \cdot x - rx \cdot x) * ((cons[1] \cdot x - rx \cdot x))) +$$
$$((cons[1] \cdot y - rx \cdot y) * ((cons[1] \cdot y - rx \cdot y))) +$$
$$((cons[3] \cdot x - rx \cdot x) * ((cons[3] \cdot x - rx \cdot x))) +$$
$$((cons[3] \cdot y - rx \cdot y) * ((cons[3] \cdot y - rx \cdot y))));$$
$$\text{distance} \cdot y = \text{sqrt}(((cons[0] \cdot x - rx \cdot x) * ((cons[0] \cdot x - rx \cdot x))) +$$
$$((cons[0] \cdot y - rx \cdot y) * ((cons[0] \cdot y - rx \cdot y))) +$$

-continued
$$((cons[1] \cdot x - rx \cdot x) * ((cons[1] \cdot x - rx \cdot x))) +$$
$$((cons[1] \cdot y - rx \cdot y) * ((cons[1] \cdot y - rx \cdot y)))) -$$
$$\text{sqrt}(((cons[2] \cdot x - rx \cdot x) * ((cons[2] \cdot x - rx \cdot x))) +$$
$$((cons[2] \cdot y - rx \cdot y) * ((cons[2] \cdot y - rx \cdot y))) +$$
$$((cons[3] \cdot x - rx \cdot x) * ((cons[3] \cdot x - rx \cdot x))) +$$
$$((cons[3] \cdot y - rx \cdot y) * ((cons[3] \cdot y - rx \cdot y))));$$

where rx.x is the I received sample and rx.y is the Q received sample. The "cons[ ]" are the coherent reference symbols which are the four values associated with the four possible phases (0, 90, 180 and 270 degrees).

The system can perform bit hard decisions on the received coherent phase (after re-mapping), and can perform bit hard decisions on the differential phase. When the decisions differ, the system scales the computed bit soft decision by a factor from 0 to 1.

Since the computation of bit soft decisions can be computationally intensive, a look-up table can be used instead. To further reduce the size of table, only one quadrant of soft decisions can be stored and the determination of whether soft decisions are positive or negative can be done based on the quadrant of the demodulated symbol. The distance value could be computed for the most significant bit (MSB) and least significant bit (LSB). It is possible to perform the soft decision calculations in a digital signal processor (DSP) in a sequential fashion. It is also possible to perform the soft decision calculations in a parallel fashion such as in a field programmable gate array (FPGA). The phase tracker helps obtain the coherent data. The differential data is obtained by subtracting a previous phase from the current phase. Thus, two separate sets of data values can be obtained for each symbol. In a hard decision, the phase value is converted to two bits and this can be done simultaneously or sequentially with the differential calculation. The soft decisions can be scaled by a value to compensate for unreliability.

Figure 2:
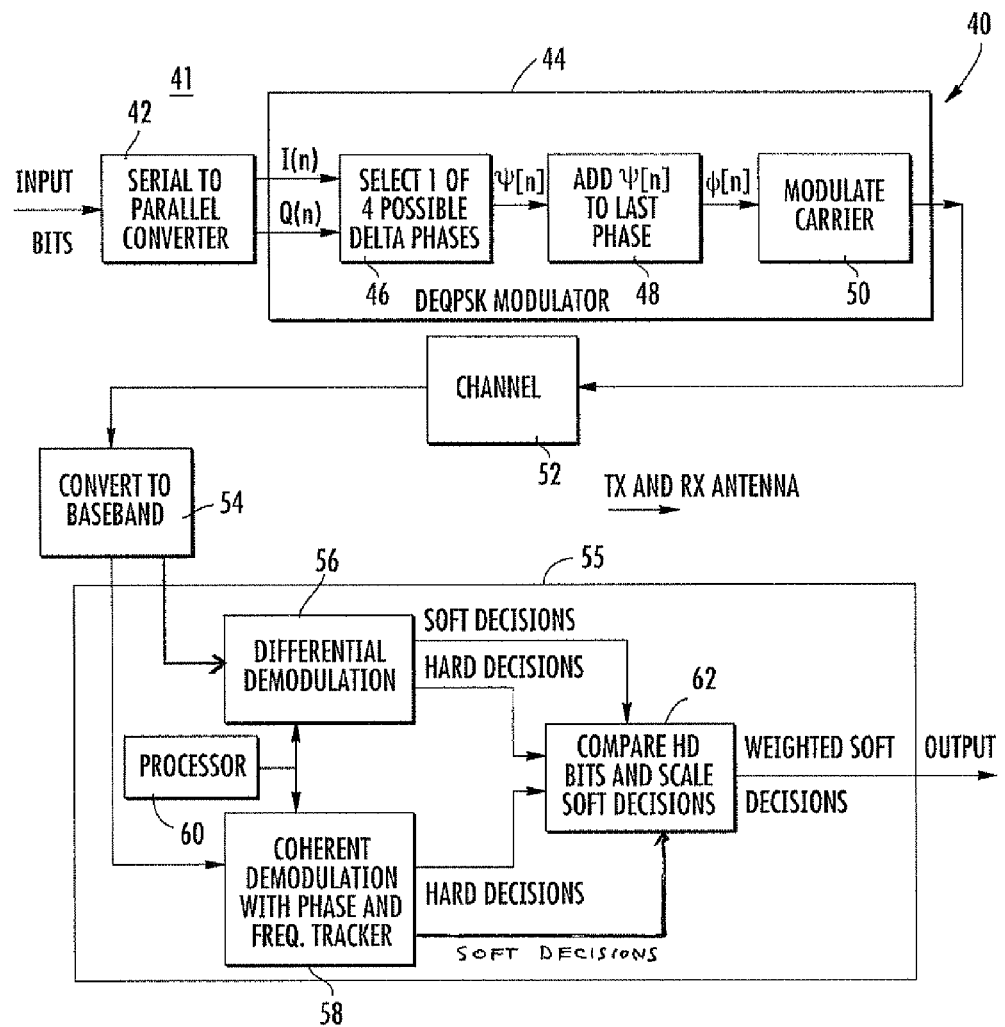
FIG. 2 is a block diagram showing a DEQPSK transmitter and a DEQPSK differential and coherent (i.e. using a phase/frequency tracker) demodulator in accordance with a non-limiting example of the present invention, and showing the differential block providing soft decisions (coherent block could provide soft decisions instead in an alternate embodiment of invention or soft decisions from both blocks could be combined). In addition, the weighting factor could be varied as a function of signal-to-noise ratio (SNR). For example, weighing soft decisions by 0.5 at low SNRs and by 0.0 at higher SNRs (as a non-limiting example).

FIG. 2 is an example of a system 40 in accordance with a non-limiting example of the present invention and showing a transmitter 41 that receives input bits within a serial-to-parallel converter 42 and outputs the in phase (I) and quadrature phase (Q) signals into the DEQPSK modulator 44. A circuit selects one of four possible Delta phases 46, which is added to the last phase 48. The carrier is modulated within the modulator circuit 50 and is transmitted along the channel 52 and converted to baseband 54 and received within the demodulator 55. After baseband conversion, the signal is split into a differential demodulator 56 and coherent demodulator with phase and frequency tracking 58. A processor 60 provides the appropriate processing control, Soft decisions and hard decisions are output from the differential demodulator and hard decisions are output from the coherent demodulator and input into the comparator circuit 62 that compares hard decision bits and scales soft decisions to output the weighted soft decisions.

Figure 3A:
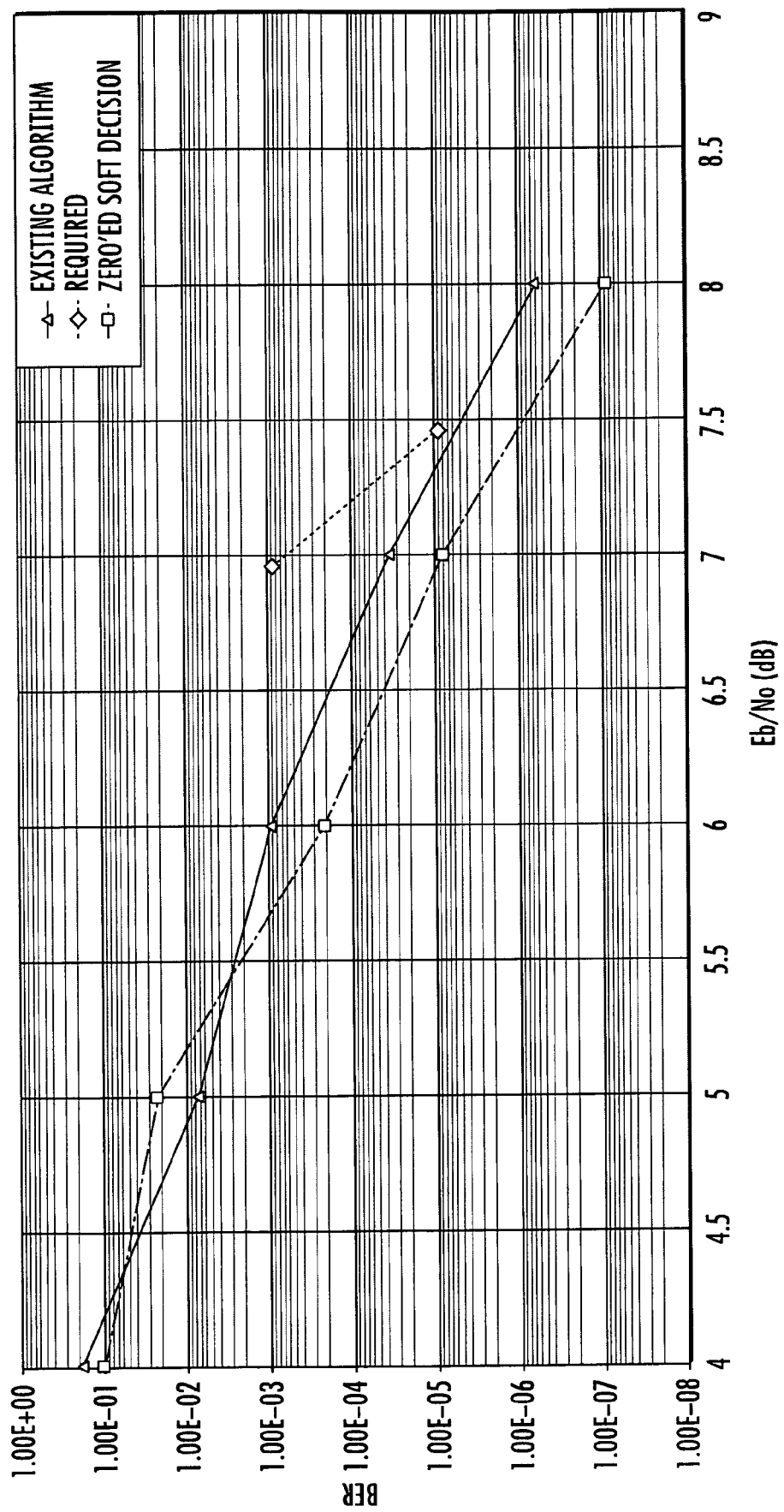
FIG. 3A is a graph comparing the performance of a standard DEQPSK demodulator (labeled existing algorithm) and of new invention using zero weighted soft decisions (for differential/coherent bits that differ) in accordance with a non-limiting example of the present invention.

As shown in the graph of FIG. 3A, with a zeroed soft decision, performance is improved by about 0.3 dB with low computational complexity. Although 0.3 dB sounds small, it could be the difference between meeting the tight BER performance requirements of standards.

Figure 3B:
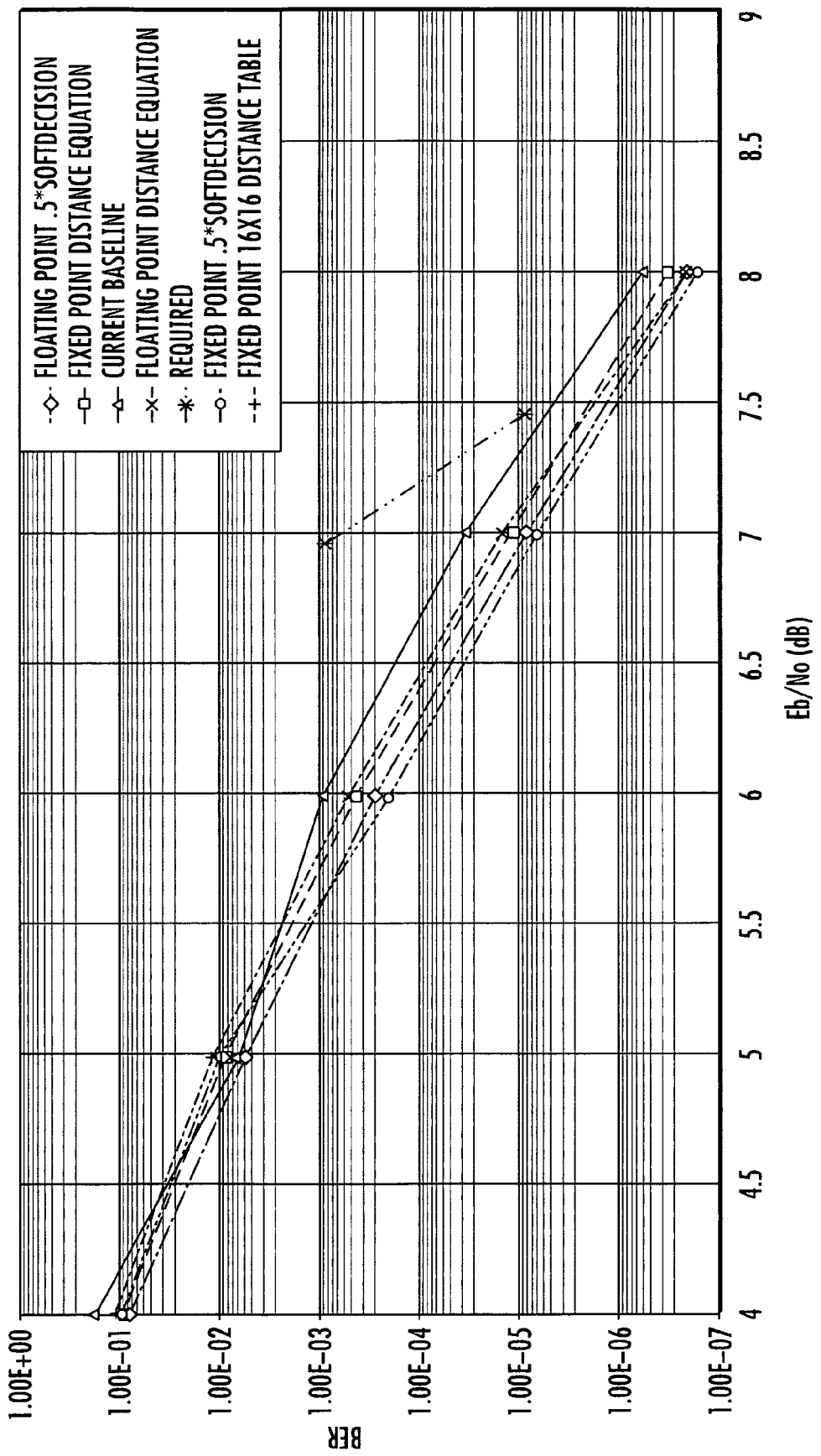
FIG. 3B is a graph showing the implementation loss of fixed-point precision for soft decisions and for limiting the size of soft-decision look-up table when a scale factor of 0.5 is used to scale soft decisions when coherent and differential demodulated bits differ.

FIG. 3B shows a bit error rate curved spreadsheet that evaluates and compares choices of fixed-point (integer) versus floating point implementation and of using a quantized pre-computed look-up table for soft decisions (instead of using equation shown in paragraph [0039]. 0.5 is used as the weighting for bit soft-decision that differ for coherent versus differential demodulation.

It is also possible to use a fixed-point conversion table that can be created from pre-calculating the possible phase coordinates and generating a table that uses each possible X and Y coordinate with a corresponding soft decision value. For a fixed-point (integer) digital signal processor, it is faster and more simple to do a table look-up than calculate a square root, which often could be a never-ending series of divisions and additions when implemented as a power-series.

There now follows the pseudo-code example for the table look-up.

```
include <stdio.h>
/* Some usefull defines */
define PI3.1415926535897931
define RAD_TO_DEG(x)(180.*(x)/PI)
define DEG_TO_RAD(x)(PI*(x)/180.)
define ABS(x)(((x) > 0.0) ? (x): (-x))
define TB96
define INTERLEAVER_SIZE112
/* Define complex number */
typedef struct {double x, y;} complex;
/* Define the size of fixed point variables */
typedef long int_type;
typedef unsigned long u_int_type;
double cos(double x);
double sin(double x);
double acos(double x);
double atan2(double y, double x);
double sqrt(double x);
double log(double x);
double log1O(double x);
double pow(double x, double y);
double exp(double x);
/* Constellation of M-PSK */
complex cons[4];
/* gray coding */
int_type gray[4];
/* Table to store soft decisions */
short distance_metric[128][128][2];
int main(void)
    {u_int_type i,j;
    float soft_dec[2];
void ComputeTable(complex *rx_ref, float *sd);
    /* Array for gray coding data so adjacent symbols *
     * have only one bit different*/
    gray[0] = 0;
    gray[1] = 3;
    gray[2] = 1;
    gray[3] = 2;
    /* Setup M-PSK constellation */
    {double phase,delta=(2.0*PI/4.0);
        for (i=0; i<4; i++) {
            phase = (gray[i]*delta);
            cons[i].x = 510.0*cos(phase);
            cons[i].y = 510.0*sin(phase);
            }
    }
    /* For loops to generate table */
    for (i=0; i<128; i++) {
        for(j=0; j<128; j++){
            complex val;
            val.x = ((float) (i*8));
            val.y = ((float) (j*8));
            ComputeTable(&val, soft_dec);
            distance_metric[i][j][0] = ((int)(soft_dec[0]))&0xffff;
            distance_metric[i][j][1] = ((int)(soft dec[1]))&0xffff;
            }
        }
    }
void ComputeTable(complex *rx_ref, float *sd)
    {complex val=*rx_ref;
    float t1,t2;
    t1 = sqrt(((cons[0].x-val.x)*((cons[0].x-val.x))) +
```

```
        ((cons[0].y-val.y)*((cons[0].y-val.y))) +
        ((cons[2].x-val.x)*((cons[2].x-val.x))) +
        ((cons[2].y-val.y)*((cons[2].y-val.y)))) -
        sqrt(((cons[1].x-val.x)*((cons[1].x-val.x))) +
        ((cons[1].y-val.y)*((cons[1].y-val.y))) +
        ((cons[3].x-val.x)*((cons[3].x-val.x))) +
        ((cons[3].y-val.y)*((cons[3].y-val.y))));
    t2 = sqrt(((cons[0].x-val.x)*((cons[0].x-val.x))) +
        ((cons[0].y-val.y)*((cons[0].y-val.y))) +
        ((cons[1].x-val.x)*((cons[1].x-val.x))) +
        ((cons[1].y-val.y)*((cons[1].y-val.y)))) -
        sqrt(((cons[2].x-val.x)*((cons[2].x-val.x))) +
        ((cons[2].y-val.y)*((cons[2]0y-val.y)) +
        ((cons[3].x-val.x)*((cons[3].x-val.x))) +
        ((cons[3].y-val.y)*((cons[3].y-val.y))));
    sd[0] = t1;
    sd[1] = t2;
}
```

It should be understood that a software version of a Viterbi algorithm with a generic Viterbi decoder and a 16-bit soft-decision branch metrics can be used as disclosed in commonly assigned U.S. patent application Ser. No. 11/625,305, filed Jan. 20, 2007, the disclosure which is hereby incorporated by reference in its entirety.

For purposes of description, some background information on coding, interleaving, and an exemplary wireless, mobile radio communications system that includes ad-hoc capability and can be modified for use is set forth. This example of a communications system that can be used and modified for use with the present invention is now set forth with regard to FIGS. 6 and 7.

An example of a radio that could be used with such system and method is a Falcon™ III radio manufactured and sold by Harris Corporation of Melbourne, Fla. This type of radio can support multiple wavebands form 30 MHz up to 2 GHz, including L-band SATCOM and MANET. The waveforms can provide secure IP data networking. It should be understood that different radios can be used, including software defined radios that can be typically implemented with relatively standard processor and hardware components. One particular class of software radio is the Joint Tactical Radio (JTR), which includes relatively standard radio and processing hardware along with any appropriate waveform software modules to implement the communication waveforms a radio will use. JTR radios also use operating system software that conforms with the software communications architecture (SCA) specification (see www.jtrs.saalt.mil), which is hereby incorporated by reference in its entirety. The SCA is an open architecture framework that specifies how hardware and software components are to interoperate so that different manufacturers and developers can readily integrate the respective components into a single device.

The Joint Tactical Radio System (JTRS) Software Component Architecture (SCA) defines a set of interfaces and protocols, often based on the Common Object Request Broker Architecture (CORBA), for implementing a Software Defined Radio (SDR). In part, JTRS and its SCA are used with a family of software re-programmable radios. As such, the SCA is a specific set of rules, methods, and design criteria for implementing software re-programmable digital radios.

The JTRS SCA specification is published by the JTRS Joint Program Office (JPO). The JTRS SCA has been structured to provide for portability of applications software between different JTRS SCA implementations, leverage commercial standards to reduce development cost, reduce development time of new waveforms through the ability to reuse design modules, and build on evolving commercial frameworks and architectures.

The JTRS SCA is not a system specification, as it is intended to be implementation independent, but a set of rules that constrain the design of systems to achieve desired JTRS objectives. The software framework of the JTRS SCA defines the Operating Environment (OE) and specifies the services and interfaces that applications use from that environment. The SCA OE comprises a Core Framework (CF), a CORBA middleware, and an Operating System (OS) based on the Portable Operating System Interface (POSIX) with associated board support packages. The JTRS SCA also provides a building block structure (defined in the API Supplement) for defining application programming interfaces (APIs) between application software components.

The JTRS SCA Core Framework (CF) is an architectural concept defining the essential, "core"; set of open software Interfaces and Profiles that provide for the deployment, management, interconnection, and intercommunication of software application components in embedded, distributed-computing communication systems. Interfaces may be defined in the JTRS SCA Specification. However, developers may implement some of them, some may be implemented by non-core applications (i.e., waveforms, etc.), and some may be implemented by hardware device providers.

Figure 4:
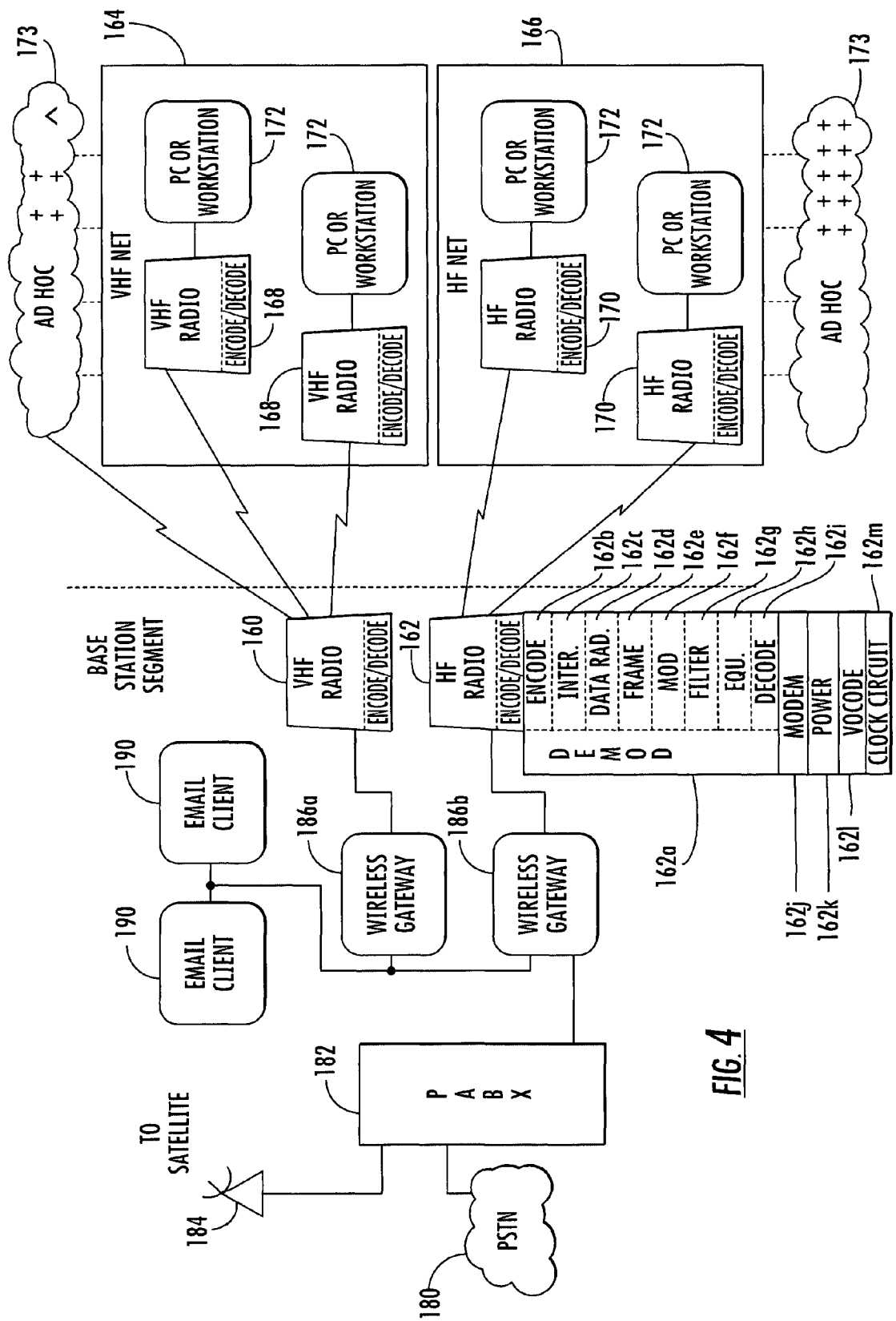
FIG. 4 is a block diagram of an example of a communications system that can be used in accordance with a non-limiting example of the present invention.

For purposes of description only, a brief description of an example of a communications system that includes communications devices that incorporate the filter in accordance with a non-limiting example, is described relative to a non-limiting example shown in FIG. 4. This high-level block diagram of a communications system includes a base station segment and wireless message terminals that could be modified for use with the present invention. The base station segment includes a VHF radio 160 and HF radio 162 that communicate and transmit voice or data over a wireless link to a VHF net 164 or HF net 166, each which include a number of respective VHF radios 168 and HF radios 170, and personal computer workstations 172 connected to the radios 168,170. Ad-hoc communication networks 173 are interoperative with the various components as illustrated. The entire network can be ad-hoc and include source, destination and neighboring mobile nodes. Thus, it should be understood that the HF or VHF networks include HF and VHF net segments that are infrastructure-less and operative as the ad-hoc communications network. Although UHF and higher frequency radios and net segments are not illustrated, these could be included.

The radio can include a demodulator circuit 162a and appropriate convolutional encoder circuit 162b, block interleaver 162c, data randomizer circuit 162d, data and framing circuit 162e, modulation circuit 162f, matched filter circuit 162g, block or symbol equalizer circuit 162h with an appropriate clamping device, deinterleaver and decoder circuit 162i modem 162j, and power adaptation circuit 162k as non-limiting examples A vocoder circuit 162l can incorporate the decode and encode functions and a conversion unit could be a combination of the various circuits as described or a separate circuit. A clock circuit 162m can establish the physical clock time and through second order calculations as described below, a virtual clock time. The network can have an overall network clock time. These and other circuits operate to perform any functions necessary for the present invention, as well as other functions suggested by those skilled in the art. Other illustrated radios, including all VHF (or UHF) and higher frequency mobile radios and transmitting and receiving stations can have similar functional circuits. Radios could range from 30 MHz to about 2 GHz as non-limiting examples.

The base station segment includes a landline connection to a public switched telephone network (PSTN) 180, which connects to a PABX 182. A satellite interface 184, such as a satellite ground station, connects to the PABX 182, which connects to processors forming wireless gateways 186a, 186b. These interconnect to the VHF radio 160 or HF radio 162, respectively. The processors are connected through a local area network to the PABX 182 and e-mail clients 190. The radios include appropriate signal generators and modulators.

An Ethernet/TCP-IP local area network could operate as a "radio" mail server. E-mail messages could be sent over radio links and local air networks using STANAG-5066 as second-generation protocols/waveforms, the disclosure which is hereby incorporated by reference in its entirety and, of course, preferably with the third-generation interoperability standard: STANAG-4538, the disclosure which is hereby incorporated by reference in its entirety. An interoperability standard FED-STD-1052, the disclosure which is hereby incorporated by reference in its entirety, could be used with legacy wireless devices. Examples of equipment that can be used in the present invention include different wireless gateway and radios manufactured by Harris Corporation of Melbourne, Fla. This equipment could include RF5800, 5022, 7210, 5710, 5285 and PRC 117 and 138 series equipment and devices as non-limiting examples.

These systems can be operable with RF-5710A high-frequency (HF) modems and with the NATO standard known as STANAG 4539, the disclosure which is hereby incorporated by reference in its entirety, which provides for transmission of long distance radio at rates up to 9,600 bps. In addition to modem technology, those systems can use wireless email products that use a suite of data-link protocols designed and perfected for stressed tactical channels, such as the STANAG 4538 or STANAG 5066, the disclosures which are hereby incorporated by reference in their entirety. It is also possible to use a fixed, non-adaptive data rate as high as 19,200 bps with a radio set to ISB mode and an HF modem set to a fixed data rate. It is possible to use code combining techniques and ARQ.

Figure 5:
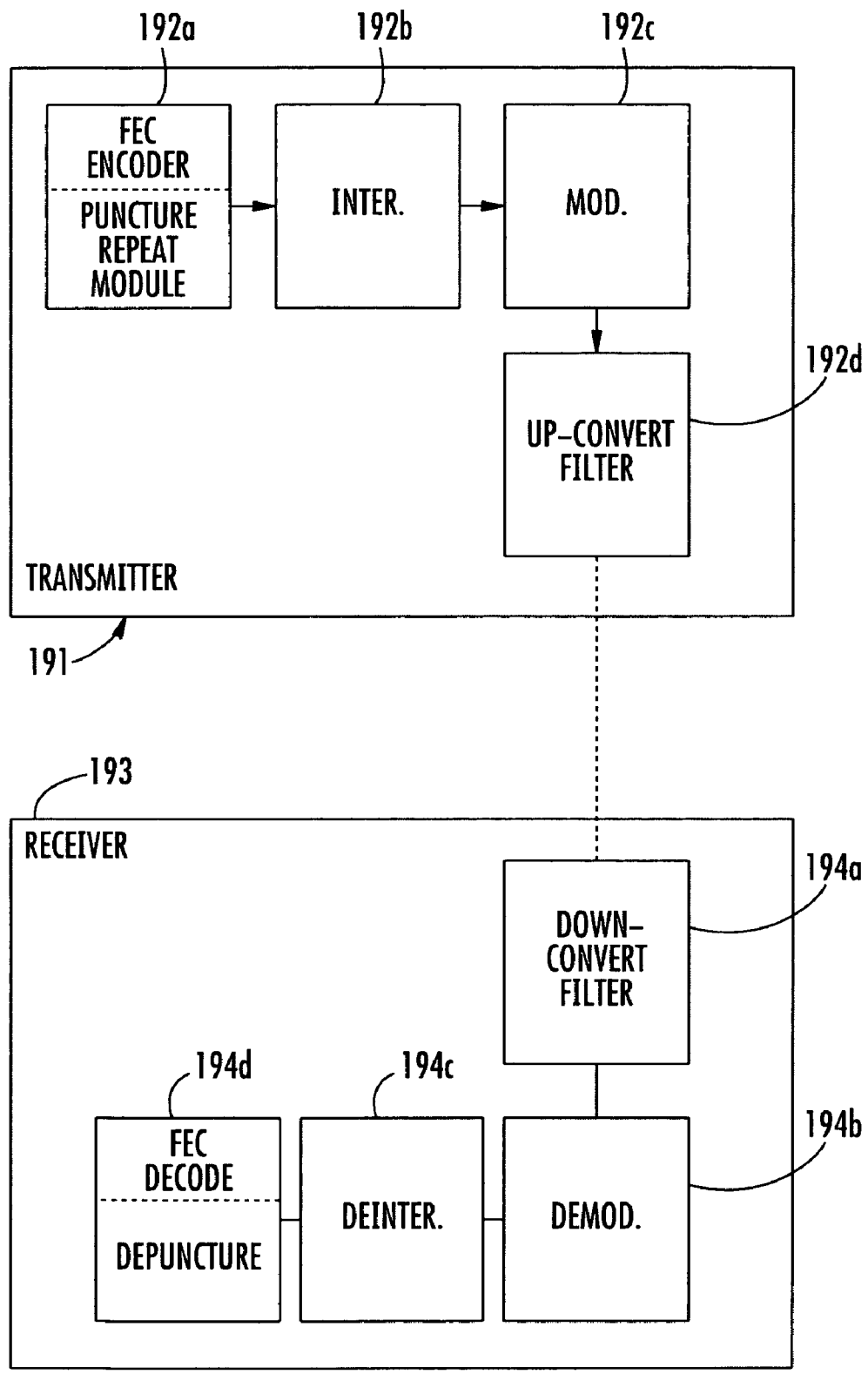
FIG. 5 is a high-level block diagram showing basic components that can be used in accordance with a non-limiting example of the present invention.

A communications system that incorporates communications devices can be used in accordance with non-limiting examples of the present invention and is shown in FIG. 5. A transmitter is shown at 191 and includes basic functional circuit components or modules, including a forward error correction encoder 192a that includes a puncturing module, which could be integral to the encoder or a separate module. The decoder 192a and its puncturing module includes a function for repeating as will be explained below. Encoded data is interleaved at an interleaver 192b, for example, a block interleaver, and in many cases modulated at modulator 192c. This modulator can map the communications data into different symbols based on a specific mapping algorithm to form a communications signal. For example, it could form Minimum Shift Keying or Gaussian Minimum Shift Keying (MSK or GMSK) symbols. Other types of modulation could be used in accordance with non-limiting examples of the present invention. Up-conversion and filtering occurs at an up-converter and filter 192d, which could be formed as an integrated module or separate modules. Communications signals are transmitted, for example, wirelessly to receiver 193.

At the receiver 193, down conversion and filtering occurs at a down converter and filter 194a, which could be integrated or separate modules. The signal is demodulated at demodulator 194b and deinterleaved at deinterleaver 194c. The deinterleaved data (i.e. bit soft decisions) is decoded and depunctured (for punctured codes), combined (for repeated codes)

and passed through (for standard codes) at decoder 194*d*, which could include a separate or integrated depuncturing module. The system, apparatus and method can use different modules and different functions. These components as described could typically be contained within one transceiver.

It should be understood, in one non-limiting aspect of the present invention, a rate 1/2, K=7 convolutional code can be used as an industry standard code for forward error correction (FEC) during encoding. For purposes of understanding, a more detailed description of basic components now follows. A convolutional code is an error-correcting code, and usually has three parameters (n, k, m) with n equal to the number of output bits, k equal to the number of input bits, and m equal to the number of memory registers, in one non-limiting example. The quantity k/n could be called the code rate with this definition and is a measure of the efficiency of the code. K and n parameters can range from 1 to 8, m can range from 2 to 10, and the code rate can range from 1/8 to 7/8 in non-limiting examples. Sometimes convolutional code chips are specified by parameters (n, k, L) with L equal to the constraint length of the code as L=k (m=1). Thus, the constraint length can represent the number of bits in an encoder memory that would affect the generation of n output bits. Sometimes the letters may be switched depending on the definitions used.

The transformation of the encoded data is a function of the information symbols and the constraint length of the code. Single bit input codes can produce punctured codes that give different code rates. For example, when a rate 1/2 code is used, the transmission of a subset of the output bits of the encoder can convert the rate 1/2 code into a rate 2/3 code. Thus, one hardware circuit or module can produce codes of different rates. Punctured codes allow rates to be changed dynamically through software or hardware depending on channel conditions, such as rain or other channel impairing conditions.

An encoder for a convolutional code typically uses a look-up table for encoding, which usually includes an input bit as well as a number of previous input bits (known as the state of the encoder), the table value being the output bit or bits of the encoder. It is possible to view the encoder function as a state diagram, a tree diagram or a trellis diagram.

Decoding systems for convolutional codes can use 1) sequential decoding, or 2) maximum likelihood decoding, also referred to as Viterbi decoding, which typically is more desirable. Sequential decoding allows both forward and backward movement through the trellis. Viterbi decoding as maximum likelihood decoding examines a receive sequence of given length, computes a metric for each path, and makes a decision based on the metric.

Puncturing convolutional codes is a common practice in some systems and is used in accordance with non-limiting examples of the present invention. It should be understood that in some examples a punctured convolutional code is a higher rate code obtained by the periodic elimination of specific code bits from the output of a low rate encoder. Punctured convolutional code performance can be degraded compared with original codes, but typically the coding rate increases.

Some of the basic components that could be used as non-limiting examples of the present invention include a transmitter that incorporates a convolutional encoder, which encodes a sequence of binary input vectors to produce the sequence of binary output vectors and can be defined using a trellis structure. An interleaver, for example, a block interleaver, can permute the bits of the output vectors. The interleaved data would also be modulated at the transmitter (by mapping to transmit symbols) and transmitted. At a receiver, a demodulator demodulates the signal.

A block deinterleaver recovers the bits that were interleaved. A Viterbi decoder could decode the deinterleaved bit soft decisions to produce binary output data.

Often a Viterbi forward error correction module or core is used that would include a convolutional encoder and Viterbi decoder as part of a radio transceiver as described above. For example if the constraint length of the convolutional code is 7, the encoder and Viterbi decoder could support selectable code rates of 1/2, 2/3, 3/4, 4/5, 5/6, 6/7, 7/8 using industry standard puncturing algorithms.

Different design and block systems parameters could include the constraint length as a number of input bits over which the convolutional code is computed, and a convolutional code rate as the ratio of the input to output bits for the convolutional encoder. The puncturing rate could include a ratio of input to output bits for the convolutional encoder using the puncturing process, for example, derived from a rate 1/2 code. The Viterbi decoder parameters could include the convolutional code rate as a ratio of input to output bits for the convolutional encoder. The puncture rate could be the ratio of input to output bits for the convolutional encoder using a puncturing process and can be derived from a rate 1/2 mother code. The input bits could be the number of processing bits for the decoder. The Viterbi input width could be the width of input data (i.e. soft decisions) to the Viterbi decoder. A metric register length could be the width of registers storing the metrics. A trace back depth could be the length of path required by the Viterbi decoder to compute the most likely decoded bit value. The size of the memory storing the path metrics information for the decoding process could be the memory size. In some instances, a Viterbi decoder could include a First-In/First-Out (FIFO) buffer between depuncture and Viterbi function blocks or modules. The Viterbi output width could be the width of input data to the Viterbi decoder.

The encoder could include a puncturing block circuit or module as noted above. Usually a convolutional encoder may have a constraint length of 7 and take the form of a shift register with a number of elements, for example, 6. One bit can be input for each clock cycle. Thus, the output bits could be defined by a combination of shift register elements using a standard generator code and be concatenated to form an encoded output sequence. There could be a serial or parallel byte data interface at the input. The output width could be programmable depending on the punctured code rate of the application.

A Viterbi decoder in non-limiting examples could divide the input data stream into blocks, and estimate the most likely data sequence. Each decoded data sequence could be output in a burst. The input and calculations can be continuous and require four clock cycles for every two bits of data in one non-limiting example. An input FIFO can be dependent on a depuncture input data rate.

It should also be understood that the present invention is not limited to convolutional codes and similar FEC, but also turbo codes could be used as high-performance error correction codes or low-density parity-check codes that approach the Shannon limit as the theoretical limit of maximum information transfer rate over a noisy channel. Thus, some available bandwidth can be increased without increasing the power of the transmission. Instead of producing binary digits from the signal, the front-end of the decoder could be designed to produce a likelihood measure for each bit.

Figure 6:
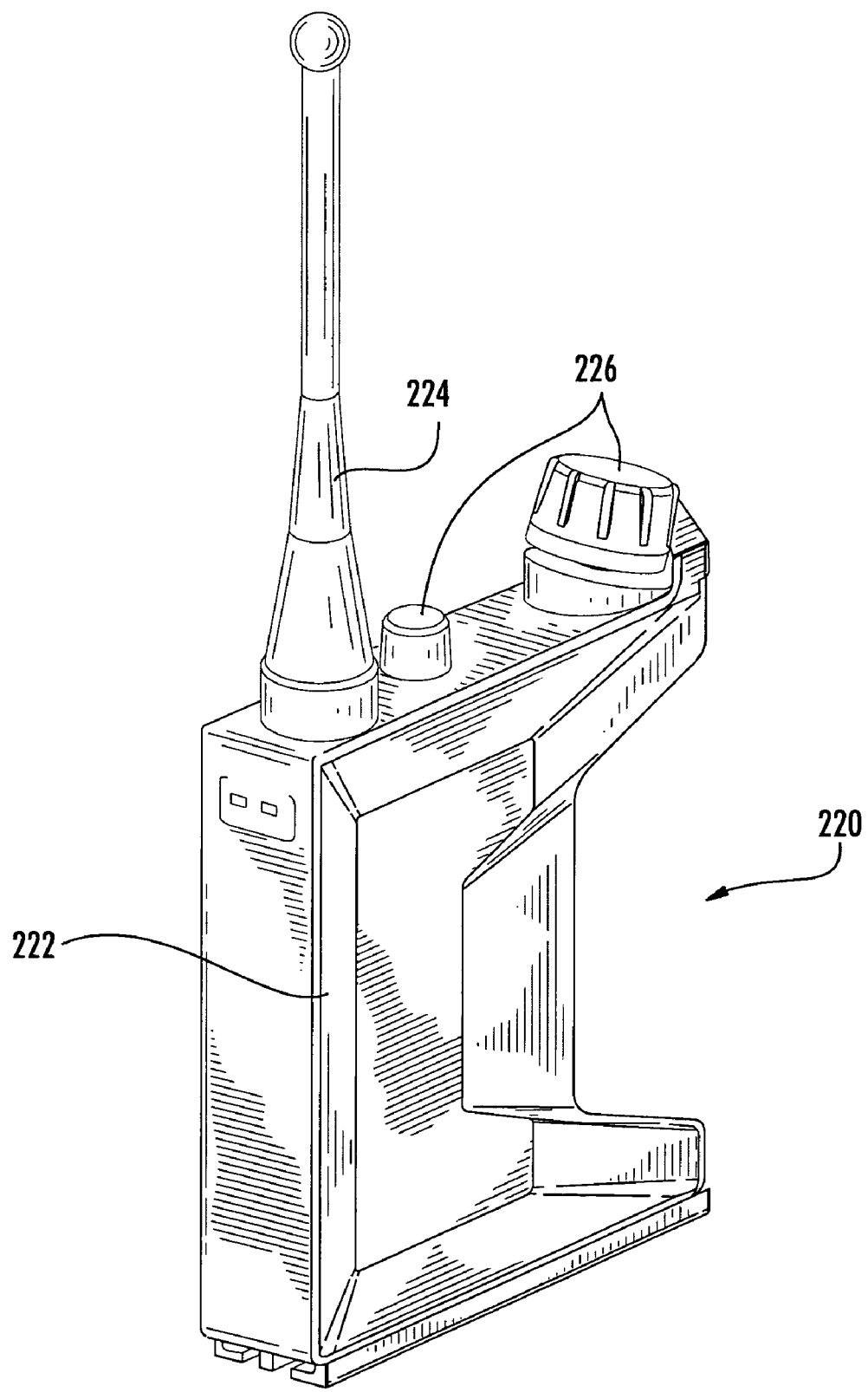
FIG. 6 is a perspective view of a portable wireless communications device as a handheld radio that could incorporate the communications system to transmit a signal having a waveform with an extended preamble in accordance with a non-limiting example of the present invention.

The system and extended preamble, in accordance with non-limiting examples of the present invention, can be used in multiprocessor embedded systems and related methods and also used for any type of radio software communications architecture as used on mainframe computers or small computers, including laptops with an added transceiver, such as used by military and civilian applications, or in a portable wireless communications device 220 as illustrated in FIG. 6. The portable wireless communications device is illustrated as a radio that can include a transceiver as an internal component and handheld housing 222 with an antenna 224 and control knobs. A Liquid Crystal Display (LCD) or similar display can be positioned on the housing in an appropriate location for display. The various internal components, including dual processor systems for red and black subsystems and software that is conforming with SCA, is operative with the illustrated radio. Although a portable or handheld radio is disclosed, the architecture as described can be used with any processor system operative with the transceiver in accordance with non-limiting examples of the present invention. An example of a communications device that could incorporate the system and method, in accordance with non-limiting examples of the present invention, is the Falcon® III manpack or tactical radio platform manufactured by Harris Corporation of Melbourne, Fla.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A receiver, comprising:
a signal input for receiving a differentially-encoded quadrature phase-shift keyed (DEQPSK) communications signal; and
a coherent demodulator circuit that performs hard bit decisions on a received coherent phase and a differential demodulator circuit that performs hard bit decisions and soft bit decisions on a received differential phase; and
a processor operative with the coherent and differential demodulator circuits that receives hard bit decisions from both of the coherent and differential demodulator circuits and compares the hard bit decisions and scales any soft bit decisions by a factor from 0 to 1 when the results of the hard bit decisions on the received coherent phase after re-mapping and differential phase are different.

2. The receiver according to claim 1, wherein said processor is operative for obtaining a last received symbol, conjugating the symbol and multiplying it by a current symbol such that the change corresponds to an estimate of the data.

3. The receiver according to claim 1, and further comprising a phase tracker operative with the coherent demodulator circuit for coherently tracking phase and frequency.

4. The receiver according to claim 3, wherein said processor is operative with the coherent demodulator circuit for obtaining a coherent estimate of data using the phase tracker.

5. The receiver according to claim 1, wherein said processor is operative for obtaining a differential data estimate and a coherent data estimate such that two separate sets of data decisions can be compared.

6. The receiver according to claim 1, wherein said scaling for soft decisions can vary as a function of received signal-to-noise ratio.

7. The receiver according to claim 1, and further comprising a look-up table used to determine the current differential data received for coherent branch based on the current coherently demodulated symbol and a previous one.

8. A method of demodulating a differentially-encoded quadrature phase-shift keyed (DEQPSK) communications signal, comprising:
receiving the DEQPSK communications signal within a receiver;
demodulating the received communications signal in a coherent demodulator circuit by performing hard bit decisions on received coherent symbols and re-mapping to differential data,
demodulating the received communications signal in a differential demodulator circuit by performing hard bit decisions and soft bit decisions on received differential symbols; and
receiving hard bit decisions from both of the coherent and differential demodulators and scaling any soft bit decisions by a factor from 0 to 1 when the results of the hard bit decisions on the coherent demodulator circuit and the differential demodulator circuit are different.

9. The method according to claim 8, which further comprises obtaining a last received symbol, conjugating the symbol and multiplying it by a current symbol such that the change corresponds to the data.

10. The method according to claim 8, which further comprises coherently demodulating the communications signal using a phase/frequency tracker.

11. The method according to claim 10, which further comprises tracking the phase and frequency of received signal.

12. The method according to claim 10, which further comprises obtaining a coherent estimate of data using the phase/frequency tracker.

13. The method according to claim 8, which further comprises obtaining a differential data estimate and a coherent data estimate such that two separate sets of data decisions can be compared.

14. The method according to claim 8, which further comprises sampling the received signal to obtain in-phase (I) and quadrature (Q) values for calculating a distance equation.

15. The method according to claim 8, which further comprises querying a look-up table for obtaining differential data based on last received coherent data and current received coherent data.

16. A method of demodulating a differentially-encoded quadrature phase-shift keyed (DEQPSK) communications signal, comprising:
receiving the DEQPSK communications signal within a modem;
demodulating the received communications signal by performing hard bit decisions in a coherent demodulator circuit on received coherent symbols and performing hard bit decisions and soft bit decisions in a differential demodulator circuit on a received differential symbols; and
using a fixed point conversion table obtained by calculating two soft decision values for a quantized set of x and y coordinates and receiving bit decisions from both of the coherent and differential demodulators and scaling soft bit decision values by a factor from 0 to 1 when the results of hard bit decisions on the coherent demodulator circuit and the differential demodulator circuit are different.

17. The method according to claim 16, which further comprises obtaining a last received symbol, conjugating the symbol and multiplying it by a current symbol such that the change corresponds to the data.

18. The method according to claim 16, which further comprises coherently demodulating using a phase tracker.

19. The method according to claim 18, which further comprises tracking the phase and frequency using the phase tracker.

20. The method according to claim 18, which further comprise obtaining a coherent estimate of data using the phase tracker.

21. The method according to claim 16, which further comprises obtaining a differential data estimate and a coherent data estimate such that two separate sets of data decisions can be compared.

22. The method according to claim 16, which further comprises sampling the received signal to obtain in-phase (I) and quadrature (Q) values for calculating a distance equation.

23. The method according to claim 16, which further comprises querying a look-up table for obtaining differential data based on last received coherent data and current received coherent data.

24. The method according to claim 16, which further comprises querying a pre-computed table to generate soft decisions based on received demodulated symbol.

25. The method according to claim 16, which further comprises scaling soft decisions obtained from pre-computed table by a factor from 0 to 1 when the hard bit decisions on the coherent demodulator circuit and the differential demodulation circuit are different.

* * * * *